(12) United States Patent
Hartz et al.

(10) Patent No.: US 8,916,641 B2
(45) Date of Patent: *Dec. 23, 2014

(54) ADHESIVE MADE OF POLYMERS HAVING CRYSTALLINE DOMAINS, AMORPHOUS POLYURETHANE AND SILANE COMPOUNDS

(75) Inventors: Oliver Hartz, Limburgerhof (DE); Axel Weiss, Speyer (DE); Karl-Heinz Schumacher, Neustadt (DE); Axel Meyer, Heidelberg (DE); Oral Aydin, Mannheim (DE)

(73) Assignee: BASF SE, Ludwigshafen (DE)

( * ) Notice: Subject to any disclaimer, the term of this patent is extended or adjusted under 35 U.S.C. 154(b) by 369 days.

This patent is subject to a terminal disclaimer.

(21) Appl. No.: 13/258,479

(22) PCT Filed: Mar. 30, 2010

(86) PCT No.: PCT/EP2010/054142
§ 371 (c)(1),
(2), (4) Date: Sep. 22, 2011

(87) PCT Pub. No.: WO2010/118948
PCT Pub. Date: Oct. 21, 2010

(65) Prior Publication Data
US 2012/0021213 A1    Jan. 26, 2012

(30) Foreign Application Priority Data
Apr. 14, 2009    (EP) ..................... 09157864

(51) Int. Cl.
| | | |
|---|---|---|
| C08L 75/00 | (2006.01) | |
| C08L 83/00 | (2006.01) | |
| C08G 18/42 | (2006.01) | |
| B32B 15/04 | (2006.01) | |
| C09J 175/08 | (2006.01) | |
| C08G 18/08 | (2006.01) | |
| C08G 18/32 | (2006.01) | |
| C08G 18/48 | (2006.01) | |
| C08G 18/66 | (2006.01) | |
| C08G 18/75 | (2006.01) | |
| C08L 23/08 | (2006.01) | |
| C09J 175/06 | (2006.01) | |
| C08K 5/5415 | (2006.01) | |
| C08L 29/04 | (2006.01) | |
| C08L 75/06 | (2006.01) | |

(52) U.S. Cl.
CPC .......... *C09J 175/08* (2013.01); *C08G 18/0823* (2013.01); *C08G 18/3234* (2013.01); *C08G 18/4825* (2013.01); *C08G 18/4854* (2013.01); *C08G 18/6692* (2013.01); *C08G 18/755* (2013.01); *C08L 23/0853* (2013.01); *C09J 175/06* (2013.01); *C08G 2170/80* (2013.01); *C08K 5/5415* (2013.01); *C08L 29/04* (2013.01); *C08L 75/06* (2013.01); *C08L 2312/08* (2013.01)
USPC ............ 524/507; 524/506; 524/539; 428/343

(58) Field of Classification Search
USPC ........................... 524/507, 506, 539; 428/343
See application file for complete search history.

(56) References Cited

U.S. PATENT DOCUMENTS

| | | | | |
|---|---|---|---|---|
| 5,258,457 | A | * | 11/1993 | Erickson ..................... 525/92 K |
| 5,476,896 | A | * | 12/1995 | Pereira et al. ................. 524/524 |
| 5,753,747 | A | * | 5/1998 | Oien ............................. 524/590 |
| H1936 | H | * | 1/2001 | Lin et al. ....................... 524/557 |
| 6,180,244 | B1 | * | 1/2001 | Rayner et al. .............. 428/424.8 |
| 7,182,951 | B1 | * | 2/2007 | Balachander et al. ........ 424/404 |
| 2002/0002232 | A1 | | 1/2002 | Sagiv et al. |
| 2003/0050347 | A1 | * | 3/2003 | Faust et al. ....................... 516/38 |
| 2003/0216519 | A1 | * | 11/2003 | Heilmann et al. ............. 525/191 |
| 2008/0026193 | A1 | | 1/2008 | Koppes et al. |
| 2008/0262131 | A1 | | 10/2008 | Linnenbrink et al. |
| 2009/0056873 | A1 | | 3/2009 | Schumacher et al. |
| 2009/0194232 | A1 | | 8/2009 | Schumacher et al. |
| 2011/0200803 | A1 | * | 8/2011 | Li ................................. 428/207 |

FOREIGN PATENT DOCUMENTS

| | | |
|---|---|---|
| EP | 1 598 382 | 11/2005 |
| WO | 2007 082826 | 7/2007 |
| WO | 2008 006733 | 1/2008 |

OTHER PUBLICATIONS

International Search Report Issued Jul. 12, 2010 in PCT/EP10/054142 Filed Mar. 30, 2010.
U.S. Appl. No. 13/259,005, filed Sep. 22, 2011, Hartz, et al.

* cited by examiner

*Primary Examiner* — Aiqun Li
(74) *Attorney, Agent, or Firm* — Oblon, Spivak, McClelland, Maier & Neustadt, L.L.P.

(57) ABSTRACT

A description is given of an adhesive comprising two components, the first component comprising at least two different polymers of which at least one contains carboxyl groups. One of the polymers is selected from polymers which are capable of forming crystalline domains and copolymers of ethylene and vinyl acetate, and the second polymer is an amorphous polyurethane, the quantitative weight ratio of first polymer to second polymer being from 2:8 to 8:2. The second component comprises at least one silane compound that is reactive toward carboxyl groups. The adhesive can be used to produce film-laminated moldings for automobile construction which feature high resistance to climatic cycling.

22 Claims, No Drawings

ADHESIVE MADE OF POLYMERS HAVING CRYSTALLINE DOMAINS, AMORPHOUS POLYURETHANE AND SILANE COMPOUNDS

The invention relates to an adhesive comprising two components, the first component comprising at least two polymers, of which at least one of the polymers contains carboxyl groups and of which a first polymer is selected from polymers which are capable of forming crystalline domains, copolymers of ethylene and vinyl acetate and their mixture, and a second polymer is an amorphous polyurethane, the second component comprising at least one silane compound that is reactive toward carboxyl groups. The adhesive can be used to produce film-laminated moldings for automobile construction, featuring high resistance to climatic cycling. The invention also relates to a method of producing film-laminated moldings for automobile construction, using the adhesives of the invention.

In order to produce composites for installation in vehicles, such as to produce interior trim parts of automobiles, for example, suitable polymeric films are permanently applied to shaped bodies, made of plastic, metal or fiber materials, for example, by means of an adhesive. For this purpose it is possible to use aqueous dispersion-based adhesives that are based on polyurethanes. For the purpose of improving the performance properties, isocyanates have frequently been employed as crosslinkers. There is a desire for isocyanate-free systems. WO 2008/006733 discloses aqueous polyurethane adhesives with silane compounds as additives. Known adhesive dispersions are not yet optimal in every respect, particularly in respect of climate and temperature exposure behavior.

Shaped composites used in automobiles are subject to frequently changing climatic and temperature exposures. Particularly in the region of bends or curvatures in the moldings, there may over time be premature failure of the adhesive bonding, and the polymer film applied by lamination may in some places detach from the molding. There is therefore a desire for adhesives having high resistance to climatic cycling.

An object of the invention was to improve further the performance properties of polyurethane dispersions for industrial lamination, particularly in respect of good climate and temperature exposure behavior of installed components in vehicles.

The invention provides an adhesive comprising a first, aqueous component and comprising a second component, the first component comprising at least one first polymer and at least one different second polymer, the first polymer being selected from polymers capable of forming crystalline domains (also referred to hereinafter as crystalline polymers), copolymers of ethylene and vinyl acetate, and the mixture of these polymers, and the second polymer being an amorphous polyurethane, and at least one of the two polymers containing carboxyl groups, the quantitative weight ratio of the first polymer to second polymer being from 2:8 to 8:2, and the second component comprising at least one silane compound that is reactive toward carboxyl groups. The first polymer is especially a polymer which, compared with a second polymer used in isolation, increases the resistance to climatic cycling of film-laminated moldings produced using the adhesive.

The two components are preferably held separately until they are applied to a substrate, and are not mixed with one another until immediately prior to application.

The invention also provides for the use of an adhesive of the invention for producing film-laminated moldings for automobile construction with high resistance to climatic cycling, and for increasing the climatic cycling resistance of film-laminated moldings for automobile construction.

High climatic cycling resistance means that, after more than one, preferably more than five or more than ten, with particular preference more than 20, test cycles in a climatic cycling test (1 cycle involves 4 h of storage at 90° C. and 80% humidity, 2 h of cooling to −30° C., 4 h of storage at −30° C. and 10% relative humidity, and 2 h of heating to 90° C.), in accordance for example with the BMW test PR 308.2 (2006-04) "Climatic testing of adhesive bonds", there is no visible detachment of a plasticized PVC film adhered to a test body.

A polymer which is capable of forming crystalline domains is a polymer which has crystalline domains when present as a polymer film in pure form at room temperature (20° C.). The polymer film may be composed wholly or partly of crystalline domains, i.e., it is not completely amorphous. The presence of crystalline domains can be ascertained by means of DSC measurements, by determination, for example, of the enthalpy of fusion of the crystallites.

The first polymer is preferably a polymer which has a heat of fusion of at least 20 J/g when in the form of a polymer film. Preferably the first polymer is crystalline in the pure state and has a melting point in the range from 30 to 150° C.

In one embodiment the first polymer is selected from the group consisting of
(i) polyurethanes which form crystalline domains and have units derived from polyester diols and
(ii) ethylene/vinyl acetate copolymers, the second polymer preferably being an amorphous polyurethane which has units derived from polyether diols.

In one embodiment the first polymer is a crystalline polyurethane and has units derived from polyester diols, and the second polymer is an amorphous polyurethane and has units derived from polyether diols, at least one of the two polyurethanes containing carboxyl groups and the quantitative weight ratio of the sum of all of the units derived from polyester diols to the sum of all of the units derived from polyether diols being preferably from 2:9 to 7:2.

Preferably the first component of the adhesive comprises
(a) 20-80 parts by weight, preferably 40-70 parts by weight, of at least one first polymer selected from (i) crystalline-domain-forming polyurethanes with units derived from polyester diols and without units derived from polyether diols, and (ii) ethylene/vinyl acetate copolymers or a mixture thereof,
(b) 20-80 parts by weight of at least one amorphous polyurethane with units derived from polyether diols and without units derived from polyester diols, and
(c) 0-50 parts by weight, preferably 10 to 40 parts by weight, of further polymers different from (a) and (b), examples being polyvinyl acetate or polyacrylate copolymer dispersionen or styrene/butadiene dispersions.

Preferably the first polymer is a polyurethane and is synthesized from
a) diisocyanates,
b) polyester diols having a molar weight of greater than 500 to 5000 g/mol,
c) diols containing carboxylic acid groups, and
d) optionally further, non-a)-c), monofunctional or polyfunctional compounds having reactive groups selected from alcoholic hydroxyl groups, primary amino groups, secondary amino groups, and isocyanate groups.

Preference is given to polyurethanes in which the polyester units account for 80-90% by weight of the polymer.

Preferably, the second polymer is a polyurethane which is synthesized from
a) diisocyanates,
b) polyether diols having a molar weight of 240 to 5000 g/mol,
c) diols containing carboxylic acid groups, and
d) optionally further, non-a)-c), monofunctional or polyfunctional compounds having reactive groups selected from alcoholic hydroxyl groups, primary amino groups, secondary amino groups, and isocyanate groups.

Preference is given to polyurethanes in which the polyether units account for 70-80% by weight of the polymer.

Preferably the polyether diols of the second polymer are selected from polytetrahydrofuran and polypropylene oxide. Preferably the polyester diols of the first polymer are selected from reaction products of dihydric alcohols with dibasic carboxylic acids, and lactone-based polyester diols.

Preferably the polyurethanes are each synthesized from at least 40%, more preferably at least 60%, and very preferably at least 80% by weight of diisocyanates, polyether diols and/or polyester diols. Preferably the first polyurethane contains polyester diols in an amount of more than 10%, more preferably greater than 30%, in particular greater than 40% or greater than 50%, with very particular preference greater than 60%, by weight, based on the first polyurethane. With preference the second polyurethane contains polyether diols in an amount of more than 10%, more preferably greater than 30%, in particular greater then 40% or greater than 50%, with very particular preference greater than 60%, by weight, based on the second polyurethane.

In one embodiment the first component comprises at least 40% by weight of (amorphous, or a mixture of amorphous and crystalline) polyurethanes, based on the solids content. In another embodiment, the first component, based on the solids content, comprises 10 to 75 parts by weight of ethylene/vinyl acetate copolymers as the first polymer.

Preferably at least the first polyurethane is crystalline in the pure state. The first polyurethane preferably has a melting point of greater than 30° C., more particularly greater than 40° C., with particular preference greater than 50° C. or else greater than 60 or greater than 70° C.; generally speaking the melting point is not greater than 150° C., more particularly not greater than 100° C. The melting point is therefore situated more particularly in the range from 30 to 150° C., more preferably from 40 to 150, and very preferably from 50 to 100° C., and in particular from 50 to 80° C. The second polyurethane is amorphous in the pure state. The first polyurethane preferably has an enthalpy of fusion of more than 20 J/g. The melting point and the enthalpy of fusion are measured by the method of differential scanning calorimetry. The measurement is made on polyurethane films with a thickness of 200 µm, which prior to measurement have been dried in a forced-air drying cabinet at 40° C. for 72 hours. In preparation for measurement, approximately 13 mg of the polyurethane are placed in pans. The pans are sealed, the samples are heated to 120° C., and then are cooled at 20 K/min and conditioned at 20° C. for 20 hours. The samples thus prepared are measured by the DSC method in accordance with DIN 53765, the sample being heated at 20 K/min. The melting temperature is evaluated as being the peak temperature in accordance with DIN 53765; the enthalpy of fusion is determined as in FIG. 4 of DIN 53765. Suitable diisocyanates are, for example, those of the formula X(NCO)2, where X is an aliphatic hydrocarbon radical having 4 to 15 C atoms, a cycloaliphatic or aromatic hydrocarbon radical having 6 to 15 C atoms, or an araliphatic hydrocarbon radical having 7 to 15 C atoms. Examples of such diisocyanates include tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI) such as the trans/trans, the cis/cis, and the cis/trans isomers, and mixtures of these compounds. Diisocyanates of this kind are available commercially.

Particularly important mixtures of these isocyanates are the mixtures of the respective structural isomers of diisocyanatotoluene and diisocyanatodiphenylmethane; the mixture of 80 mol % 2,4'-diisocyanatotoluene and 20 mol % 2,6-diisocyanatotoluene is particularly suitable. Also of particular advantage are the mixtures of aromatic isocyanates such as 2,4-diisocyanatotoluene and/or 2,6-diisocyanatotoluene with aliphatic or cycloaliphatic isocyanates such as hexamethylene diisocyanate or IPDI, in which case the preferred mixing ratio of the aliphatic to the aromatic isocyanates is 1:9 to 9:1, more particularly 4:1 to 1:4.

Compounds that can be used to synthesize the polyurethanes, in addition to those mentioned above, also include isocyanates which in addition to the free isocyanate groups carry further, blocked isocyanate groups, e.g., uretdione groups.

With a view to effective film-forming and elasticity, suitable polyester diols and polyether diols are principally relatively high molecular weight diols, having a molecular weight above 500 and up to 5000, preferably from about 1000 to 3000 g/mol. The molecular weight in question is the number-average molar weight Mn. Mn is obtained by determining the number of end groups (OH number).

Polyesterdiols are known, for example, from Ullmanns Enzyklopädie der technischen Chemie, 4th edition, volume 19, pp. 62 to 65. It is preferred to use polyester diols which are obtained by reacting dihydric alcohols with dibasic carboxylic acids. Instead of the free polycarboxylic acids it is also possible to use the corresponding polycarboxylic anhydrides or corresponding polycarboxylic esters of lower alcohols or mixtures thereof to prepare the polyesterpolyols. The polycarboxylic acids can be aliphatic, cycloaliphatic, araliphatic, aromatic or heterocyclic and can, if appropriate, be substituted, by halogen atoms for example, and/or unsaturated. Examples thereof include the following: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, and dimeric fatty acids. Preferred dicarboxylic acids are those of the general formula HOOC—(CH2)y-COOH, where y is a number from 1 to 20, preferably an even number from 2 to 20, examples being succinic acid, adipic acid, sebacic acid, and dodecanedicarboxylic acid.

Examples of suitable dihydric alcohols include ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis (hydroxymethyl)-cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol and polybutylene glycols. Preferred alcohols are those of the general formula HO—(CH2)x-OH, where x is a number from 1 to 20, preferably an even number from 2 to 20. Examples of such alcohols include ethylene glycol, butane-1,4-diol, hexane-1,6-diol, octane-1,8-diol, and dodecane-1,12-diol. Preference is also given to neopentyl glycol.

Further to the polyester diols or to the polyether diols it is also possible, if desired, to use polycarbonatediols as well, such as may be obtained, for example, by reacting phosgene with an excess of the low molecular weight alcohols specified as synthesis components for the polyesterpolyols.

It is possible, if desired, to use lactone-based polyester diols, which are homopolymers or copolymers of lactones, preferably hydroxy-terminated adducts of lactones with suitable difunctional starter molecules. Preferred lactones are those derived from compounds of the general formula HO—$(CH_2)_z$-COOH, where z is a number from 1 to 20 and where one hydrogen atom of a methylene unit may also be substituted by a $C_1$ to $C_4$ alkyl radical. Examples are ε-caprolactone, β-propiolactone, γ-butyrolactone and/or methyl-ε-caprolactone, and mixtures thereof. Examples of suitable starter components are the low molecular weight dihydric alcohols specified above as a synthesis component for the polyesterpolyols. The corresponding polymers of ε-caprolactone are particularly preferred. Lower polyester diols or polyether diols as well can be used as starters for preparing the lactone polymers. Instead of the polymers of lactones it is also possible to use the corresponding chemically equivalent polycondensates of the hydroxycarboxylic acids corresponding to the lactones.

Polyetherdiols are obtainable in particular by polymerizing ethylene oxide, propylene oxide, butylene oxide, tetrahydrofuran, styrene oxide or epichlorohydrin with itself, in the presence of $BF_3$ for example, or by subjecting these compounds, if appropriate in a mixture or in succession, to addition reaction with starter components containing reactive hydrogen atoms, such as alcohols or amines, examples being water, ethylene glycol, propane-1,2-diol, propane-1,3-diol, 2,2-bis(4-hydroxyphenyl)propane, and aniline. Particular preference is given to polypropylene oxide, polytetrahydrofuran with a molecular weight of 240 to 5000, and in particular 500 to 4500. Preferred polyether diols are those composed to an extent of less than 20% by weight of ethylene oxide.

It is also possible, if desired, to use polyhydroxyolefins as well, preferably those having 2 terminal hydroxyl groups, e.g., α,ω-dihydroxypolybutadiene, α,ω-dihydroxypolymethacrylic esters or α,ω-dihydroxypolyacrylic esters, as monomers (c1). Such compounds are known for example from EP-A 622 378. Further suitable polyols are polyacetals, polysiloxanes, and alkyd resins.

The hardness and the elasticity modulus of the polyurethanes can be increased if necessary by using as diols not only the polyester diols and/or not only the polyether diols but also different, monomeric, low molecular weight diols having a molecular weight of from about 60 to 500, preferably from 62 to 200 g/mol. Low molecular weight monomeric diols used are in particular the synthesis components of the short-chain alkanediols specified for preparing polyesterpolyols, preference being given to unbranched diols having 2 to 12 carbon atoms and an even number of carbon atoms, and also to pentane-1,5-diol and neopentyl glycol. Examples are ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, additionally diethylene glycol, triethylene glycol, tetraethylene glycol, polyethylene glycol, dipropylene glycol, polypropylene glycol, dibutylene glycol, and polybutylene glycols. Preference is given to alcohols of the general formula HO—$(CH_2)_x$—OH, where x is a number from 1 to 20, preferably an even number from 2 to 20. Examples thereof are ethylene glycol, butane-1,4-diol, hexane-1,6-diol, octane-1,8-diol, and dodecane-1,12-diol. Preference is further given to neopentyl glycol.

The fraction of polyester diols and of polyether diols, based on the total amount of all the diols, is preferably 10 to 100 mol %, and the fraction of the low molecular weight monomeric diols, based on the total amount of all the diols, is preferably 0 to 90 mol %. With particular preference the ratio of the polymeric diols to the monomeric diols is 0.1:1 to 5:1, more preferably 0.2:1 to 2:1.

In order to make the polyurethanes dispersible in water they may additionally comprise as synthesis components monomers which carry at least one isocyanate group or at least one group reactive toward isocyanate groups and, furthermore, at least one hydrophilic group or a group which can be converted into a hydrophilic group. In the text below the term "hydrophilic groups or potentially hydrophilic groups" is abbreviated to "(potentially) hydrophilic groups". The (potentially) hydrophilic groups react with isocyanates at a substantially slower rate than do the functional groups of the monomers used to synthesize the polymer main chain. The fraction of the components having (potentially) hydrophilic groups among the total quantity of all the synthesis components of the polyurethanes is generally made such that the molar amount of the (potentially) hydrophilic groups, based on the amount by weight of all of the monomers, is 30 to 1000, preferably 50 to 500, and more preferably 80 to 300 mmol/kg.

The (potentially) hydrophilic groups can be nonionic or, preferably, (potentially) ionic hydrophilic groups. Particularly suitable nonionic hydrophilic groups are polyethylene glycol ethers composed of preferably 5 to 100, more preferably 10 to 80 repeating ethylene oxide units. The amount of polyethylene oxide units is generally from 0 to 10% by weight, preferably from 0 to 6% by weight, based on the amount by weight of all the monomers. Preferred monomers containing nonionic hydrophilic groups are polyethylene oxide diols containing at least 20% by weight of ethylene oxide, polyethylene oxide monools, and the reaction products of a polyethylene glycol and a diisocyanate which carry a terminally etherified polyethylene glycol radical. Diisocyanates of this kind and processes for preparing them are specified in patents U.S. Pat. No. 3,905,929 and U.S. Pat. No. 3,920,598.

Ionic hydrophilic groups are, in particular, anionic groups such as the sulfonate, the carboxylate, and the phosphate group in the form of their alkali metal salts or ammonium salts, and also cationic groups such as ammonium groups, especially protonated tertiary amino groups or quaternary ammonium groups. Potentially ionic hydrophilic groups are, in particular, those which can be converted into the above-mentioned ionic hydrophilic groups by simple neutralization, hydrolysis or quaternization reactions, in other words, for example, carboxylic acid groups or tertiary amino groups. (Potentially) ionic monomers are described at length in, for example, Ullmanns Enzyklopädie der technischen Chemie, 4th edition, volume 19, pp. 311-313 and in, for example, DE-A 1 495 745.

Of particular practical importance as (potentially) cationic monomers are, in particular, monomers containing tertiary amino groups, examples being tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, and N-aminoalkyldialkyl-amines, the alkyl radicals and alkanediyl units of these tertiary amines consisting independently of one another of 1 to 6 carbon atoms. Also suitable are polyethers containing tertiary nitrogen atoms and preferably two terminal hydroxyl groups, such as are obtainable in a conventional manner, for example, by alkoxylating amines containing two hydrogen atoms attached to amine nitrogen, such as methylamine, aniline or N,N'-dimethylhydrazine. Polyethers of this kind generally have a molar weight of between 500 and 6000 g/mol. These tertiary amines are converted into the ammonium salts either with acids, preferably strong mineral acids such as phosphoric acid, sulfuric acid, hydrohalic acids, or strong organic acids, or by reaction with suitable quaternizing agents such as $C_1$ to $C_6$ alkyl halides or benzyl halides, e.g., bromides or chlorides.

Suitable monomers having (potentially) anionic groups normally include aliphatic, cycloaliphatic, araliphatic or aromatic carboxylic acids and sulfonic acids which carry at least one alcoholic hydroxyl group or at least one primary or secondary amino group. Preference is given to dihydroxyalkylcarboxylic acids, especially those having 3 to 10 carbon atoms, such as are also described in U.S. Pat. No. 3,412,054. Particular preference is given to compounds of the general formula (c1)

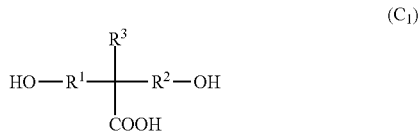

in which $R^1$ and $R^2$ are a $C_1$ to $C_4$ alkanediyl (unit) and $R^3$ is a $C_1$ to $C_4$ alkyl (unit), and especially to dimethylolpropionic acid (DMPA). Also suitable are corresponding dihydroxysulfonic acids and dihydroxyphosphonic acids such as 2,3-dihydroxypropanephosphonic acid.

Otherwise suitable are dihydroxyl compounds having a molecular weight of more than 500 to 10 000 g/mol and at least 2 carboxylate groups, which are known from DE-A 39 11 827. They are obtainable by reacting dihydroxyl compounds with tetracarboxylic dianhydrides such as pyromellitic dianhydride or cyclopentanetetracarboxylic dianhydride in a molar ratio of from 2:1 to 1.05:1 in a polyaddition reaction. Particularly suitable dihydroxyl compounds are the monomers (b2) cited as chain extenders and also the diols (b1).

At least one of the polyurethanes, preferably both the first and the second polyurethane, contain carboxyl groups. The carboxyl groups may be introduced into the polyurethanes by the aforementioned aliphatic, cycloaliphatic, araliphatic or aromatic carboxylic acids which carry at least one alcoholic hydroxyl group or at least one primary or secondary amino group. Dihydroxyalkylcarboxylic acids are preferred, especially those with 3 to 10 C atoms, more particularly dimethylolpropionic acid.

Further monomers containing amino groups reactive toward isocyanates include aminocarboxylic acids such as lysine, β-alanine or the adducts of aliphatic diprimary diamines with α,β-unsaturated carboxylic or sulfonic acids that are specified in DE-A 20 34 479. Such compounds obey, for example, the formula (c2)

where $R^4$ and $R^5$ independently of one another are a $C_2$ to $C_6$ alkanediyl unit, preferably ethylene and X is COOH or $SO_3H$.

Particularly preferred compounds of the formula (c2) are N-(2-aminoethyl)-2-aminoethanecarboxylic acid and also N-(2-aminoethyl)-2-aminoethanesulfonic acid and the corresponding alkali metal salts, with Na being a particularly preferred counterion. Also particularly preferred are the adducts of the abovementioned aliphatic diprimary diamines with 2-acrylamido-2-methylpropanesulfonic acid, as described for example in DE-B 1 954 090.

Where monomers with potentially ionic groups are used, their conversion into the ionic form may take place before, during or, preferably, after the isocyanate polyaddition, since the ionic monomers are frequently difficult to dissolve in the reaction mixture. Examples of neutralizing agents include ammonia, NaOH, triethanolamine (TEA), tri-isopropylamine (TIPA) or morpholine, or its derivatives. The sulfonate or carboxylate groups are particularly preferably in the form of their salts with an alkali metal ion or ammonium ion as counterion.

Polyfunctional monomers, which if desired are also constituents of the polyurethane, serve generally for crosslinking or chain extension. They generally comprise nonphenolic alcohols with a functionality of more than 2, amines having 2 or more primary and/or secondary amino groups, and compounds which as well as one or more alcoholic hydroxyl groups carry one or more primary and/or secondary amino groups. Alcohols having a functionality of more than 2, which may be used in order to set a certain degree of branching or crosslinking, include for example trimethylolpropane, glycerol, or sugars. Also suitable are monoalcohols which as well as the hydroxyl group carry a further isocyanate-reactive group, such as monoalcohols having one or more primary and/or secondary amino groups, monoethanolamine for example. Polyamines having 2 or more primary and/or secondary amino groups are used especially when the chain extension and/or crosslinking is to take place in the presence of water, since amines generally react more quickly than alcohols or water with isocyanates. This is frequently necessary when the desire is for aqueous dispersions of crosslinked polyurethanes or polyurethanes having a high molar weight. In such cases the approach taken is to prepare prepolymers with isocyanate groups, to disperse them rapidly in water, and then to subject them to chain extension or crosslinking by adding compounds having two or more isocyanate-reactive amino groups. Amines suitable for this purpose are generally polyfunctional amines of the molar weight range from 32 to 500 g/mol, preferably from 60 to 300 g/mol, which contain at least two amino groups selected from the group consisting of primary and secondary amino groups. Examples of such amines are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane. The amines can also be used in blocked form, e.g., in the form of the corresponding ketimines (see for example CA-A 1 129 128), ketazines (cf. e.g. U.S. Pat. No. 4,269,748) or amine salts (see U.S. Pat. No. 4,292,226). Oxazolidines as well, as used for example in U.S. Pat. No. 4,192,937, represent blocked polyamines which can be used for the preparation of the polyurethanes of the invention, for chain extension of the prepolymers. Where blocked polyamines of this kind are used they are generally mixed with the prepolymers in the absence of water and this mixture is then mixed with the dispersion water or with a portion of the dispersion water, so that the corresponding polyamines are liberated by hydrolysis. It is preferred to use mixtures of diamines and triamines, more preferably mixtures of isophoronediamine (IPDA) and diethylenetriamine (DETA). The polyurethanes comprise preferably from 1 to 30 mol %, more preferably from 4 to 25 mol %, based on the total amount of all synthesis components, of a polyamine having at least 2 isocyanate-reactive amino groups. For the same purpose it is also possible to use isocyanates having a functionality of more than two. Examples of standard commercial compounds are the isocyanurate or the biuret of hexamethylene diisocyanate.

Monofunctional monomers, which are used as well if desired, are monoisocyanates, monoalcohols, and mono-primary and -secondary amines. Their fraction is generally not more than 10 mol %, based on the total molar amount of the monomers. These monofunctional compounds customarily carry further functional groups such as olefinic groups or carbonyl groups and serve to introduce into the polyurethane functional groups which facilitate the dispersing and/or the crosslinking or further polymer-analogous reaction of the polyurethane. Monomers suitable for this purpose include those such as isopropenyl-α,α-dimethylbenzyl isocyanate (TMI) and esters of acrylic or methacrylic acid such as hydroxyethyl acrylate or hydroxyethyl methacrylate.

Within the field of polyurethane chemistry it is general knowledge how the molecular weight of polyurethanes can be adjusted by selecting the proportions of the mutually reactive monomers and also the arithmetic mean of the number of reactive functional groups per molecule. The components and their respective molar amounts are normally chosen so that the ratio A:B, where A is the molar amount of isocyanate groups and B is the sum of the molar amount of the hydroxyl groups and the molar amount of the functional groups which are able to react with isocyanates in an addition reaction, is from 0.5:1 to 2:1, preferably from 0.8:1 to 1.5, more preferably from 0.9:1 to 1.2:1. With very particular preference the ratio A:B is as close as possible to 1:1. The monomers employed carry on average usually from 1.5 to 2.5, preferably from 1.9 to 2.1, more preferably 2.0 isocyanate groups and/or functional groups which are able to react with isocyanates in an addition reaction.

The polyaddition of the synthesis components for preparing the polyurethane takes place preferably at reaction temperatures of up to 180° C., preferably up to 150° C., under atmospheric pressure or under the autogenous pressure. The preparation of polyurethanes, and of aqueous polyurethane dispersions, is known to the skilled worker.

Ethylene/vinyl acetate copolymers for the purposes of the invention are copolymers which are synthesized predominantly, i.e., to an extent of more than 50%, preferably at least 60%, or even 100%, by weight of ethylene monomers and vinyl acetate monomers. The ethylene/vinyl acetate weight ratio here is preferably less than or equal to 1, more particularly less than 0.66 or less than 0.4. Further monomers may be, for example, acrylic esters of methacrylic esters in amounts of 0 to less than 50% by weight, more particularly of 1 to less than 35% by weight.

The polyurethanes and the ethylene/vinyl acetate copolymers are preferably in the form of an aqueous dispersion and are used in that form.

The silane compound used in the adhesive of the invention preferably has the formula

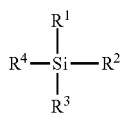

in which $R^1$ to $R^4$ each independently are an organic radical or a hydroxyl group, with the proviso that at least two of the groups $R^1$ to $R^4$ are groups selected from hydroxyl groups and alkoxy groups, and at least one of the remaining groups $R^1$ to $R^4$ is an organic radical which contains at least one functional group selected from primary amino groups, secondary amino groups, acid groups, acid anhydride groups, carbamate groups, isocyanate groups, hydroxyl groups, and epoxy groups.

Preferably two or three, more preferably three, of the groups $R^1$ to $R^4$ are a hydroxyl group or an alkoxy group. In general they are alkoxy groups; in the course of the subsequent use, the alkoxy groups then undergo hydrolysis to form hydroxyl groups, which then react further, or crosslink. The group in question is in particular a $C_1$ to $C_9$, preferably a $C_1$ to $C_6$, more preferably a $C_1$ to $C_3$ alkoxy group, with very particular preference a methoxy or ethoxy group, and in particular a methoxy group.

The remaining groups $R^1$ to $R^4$ are an organic radical whose molar weight is generally less than 500 g/mol, in particular less than 200 g/mol, with particular preference less than 150 or less than 100 g/mol. The remaining groups $R^1$ to $R^4$ may be, for example, aliphatic or aromatic hydrocarbon groups, or hydrocarbon groups containing not only aliphatic, including cycloaliphatic, but also aromatic constituents. At least one of the remaining groups $R^1$ to $R^4$ is an organic radical which comprises at least one functional group selected from a primary or secondary amino group, an acid group, acid anhydride group, carbamate group, hydroxyl group, isocyanate group or an epoxy group. Particularly preferred functional groups are the primary or secondary amino group, epoxy group, especially glycidyl group, or the carbamate group. Particular preference is given to the epoxy group, especially glycidyl group. The remaining groups $R^1$ to $R^4$ may also comprise two or more functional groups, examples being two primary amino groups, two secondary amino groups, or one primary and one secondary amino group.

In preferred silanes, three of the radicals $R^1$ to $R^4$ are a hydroxyl or alkoxy group (preferably alkoxy group; see above) and the one remaining radical is an organic radical having at least one functional group. Likewise preferred are silanes in which two of the radicals $R^1$ to $R^4$ are a hydroxyl or alkoxy group (preferably alkoxy group; see above) and the two remaining radicals are each an organic radical having at least one functional group. Particular preference is given to glycidyloxyalkyltrialkoxysilanes having in each case 1 to 5 C atoms in the alkyl and alkoxy groups. Examples of suitable silanes include 3-glycidyloxypropyltrimethoxysilane, 3-glycidyloxypropyl-triethoxysilane, N-(2-aminoethyl)-3-aminopropyltrimethoxysilane, 3-(triethoxysilyl)-propylsuccinic anhydride, and N-trimethoxysilylmethyl-O-methylcarbamate.

Suitable silanes are, in particular, of low molecular weight and have a molar weight below 5000, in particular below 2000, more preferably below 1000, and very preferably below 500 g/mol; the molar weight is generally above 50, in particular above 100, or 150 g/mol.

The silane compounds are used preferably in amounts of more than 0.2 part, more particularly more than 1 part or more than 2 parts by weight per 100 parts by weight of polyurethane, and preferably not more than 30, more particularly not more than 20, with particular preference not more than 10 parts by weight per 100 parts by weight of polyurethane.

A major constituent of the first adhesive component is the mixture of the first and second polymers as binders. The first adhesive component is composed preferably to an extent of at least 20%, more preferably at least 30%, very preferably at least 40%, and more particularly at least 50% by weight, or to an extent of at least 70% by weight, of the mixture of the first and second polymers, based on the solids content, i.e., without water or other solvents which are liquid at 21° C. and 1 bar. The first adhesive component is aqueous—that is, it comprises water as sole or predominant solvent or dispersion medium.

The first adhesive component may be composed solely of the mixture of the first and second polymers, apart from water or other solvents which escape on drying. Alternatively it may also comprise further additives, examples being further binders, stabilizers, fillers, thickeners, wetting assistants, defoamers, crosslinkers, aging inhibitors, fungicides, pigments, soluble dyes, matting agents, and neutralizing agents. Further additives may be added in a simple way to the mixture of the first and second polymers, or to the aqueous dispersion thereof. Suitable stabilizers are in principle those stabilizers commonly used for aqueous dispersions. Very storage-stable polymer dispersion compositions are obtained using stabilizers selected from the group encompassing wetting agents, cellulose, polyvinyl alcohol, polyvinylpyrrolidone, and mixtures thereof. The invention accordingly also provides an adhesive as described above which comprises at least one further additive selected from further binders, stabilizers, fillers, thickeners, wetting assistants, defoamers, crosslinkers, aging inhibitors, fungicides, pigments, soluble dyes, matting agents, and neutralizing agents.

Contemplated as further binders which can be used in a mixture with the first and second polymers are, in particular, free-radically polymerized polymers, preferably in the form of their aqueous dispersions. Such polymers are composed preferably to an extent of at least 60% by weight of what are called principal monomers, selected from $C_1$ to $C_{20}$ alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers. Particularly noteworthy polymers are those constructed to an extent of more than 60% by weight from $C_1$-$C_{20}$ alkyl(meth)acrylates, i.e., (polyacrylates), or those which are composed to an extent of more than 60% by weight of styrene and 1,3-butadiene, i.e., styrene/butadiene copolymers, more particularly carboxylated styrene/butadiene copolymers. Carboxylated styrene/butadiene copolymers are formed from styrene, butadiene, and at least one ethylenically unsaturated, free-radically polymerizable monomer having at least one carboxyl group, examples being acrylic acid, methacrylic acid, fumaric acid, itaconic acid, etc., preferably acrylic acid.

In one particular embodiment the adhesive contains no further kinds of binders other than the first and second polymers. In another embodiment the adhesive contains 10 to 50 parts, or 20 to 50 parts, or 30 to 50 parts, by weight, based on the sum of all of the polymers of the adhesive, of further binders, different from the first and second polymers, these further binders being preferably polyacrylates and/or styrene/butadiene copolymers.

The further constituents of the adhesive may also include, for example, further crosslinkers. Suitable examples include chemically blocked isocyanates, encapsulated isocyanates, encapsulated uretdiones, biurets or allophanates, or compounds with carbodiimide groups. The additional crosslinker may be attached to the polyurethane or else may be a compound which is dissolved or dispersed in the polyurethane. The adhesive does not need any further crosslinkers in order to achieve the desired properties, and preferably, therefore, the adhesive also contains no further crosslinkers.

Particularly advantageous compositions are those which are free from organic solvents, more particularly free from what are known as VOCs (volatile organic compounds) and/or free from plasticizers. Both plasticizers and organic solvents are disadvantageous from the standpoints of environmental toxicology and occupational hygiene. Plasticizers may migrate to the surface and lead to failure of an adhesive bond, or may make the surface tacky, leading to swelling of the adhesive joints. Solvents as well are unwanted, since, first, they may pose an additional hazard potential on heating and on application of the adhesive, and second because they too may migrate and, over a long time, may be given off to the environment and to materials which are in contact with the adhesive, and may adversely affect these systems, and/or may lead to failure of the adhesive bond. Consequently the first adhesive component is preferably a purely aqueous system with water as sole solvent or sole dispersion medium. The solids content, i.e., the amount of all of the constituents apart from water or other substances which are liquid at 21° C. and 1 bar, is preferably between 20% and 80% by weight.

The invention also provides for the use of a composition which comprises at least one first polymer and a least one different, second polymer, the first polymer being selected from polymers which are capable of forming crystalline domains and copolymers of ethylene and vinyl acetate, and the second polymer being an amorphous polyurethane, with at least one of the two polymers containing carboxyl groups, the ratio of amount by weight of first polymer to second polymer being from 2:8 to 8:2, for preparing an adhesive of the invention as described above. The invention also provides for the use of an adhesive of the invention as described for producing film-laminated moldings for automobile construction with high resistance to climatic cycling.

The adhesive of the invention can be used as a two-component (2K) adhesive. In the case of a 2K adhesive, a further additive, generally a crosslinker, in the present case the silane, is added prior to use. The adhesive of the invention is particularly suitable as a laminating adhesive, more particularly for producing composites by permanent adhesive bonding of extensive, flexible first substrates to solid shaped bodies as the second substrate. The extensive first substrates are selected more particularly from polymer films, paper, metal foils, wood veneer, and webs of natural or synthetic fibers. They are bonded to one another or, preferably, to solid shaped bodies, examples being shaped metal parts, painted metal, wood, wood base materials, fiber materials or plastic.

The invention also provides a method of producing film-laminated moldings, especially for automobile construction, where
  a) a first adhesive component of the invention, as described above, and a second adhesive component of the invention, as described above, a polymer film, and a molding intended, for example, for installation in an automobile are made available,
  b) the adhesive components are mixed and the mixture is applied to the polymer film and/or to the molding, and
  c) subsequently the polymer film is bonded to the molding under pressure and/or temperature increase.

Composites produced in accordance with the invention may additionally have primer layers to promote adhesion between first substrate and adhesive layer and/or between second substrate and adhesive layer. The moldings or substrates to be bonded may have been pretreated with adhesion promoters. Owing to the already good adhesion properties of adhesives of the invention, however, the application of primers is not absolutely necessary.

Particular preference as the first substrate is given to polymer films. Polymer films are, more particularly, flexible, substantially two-dimensional plastics in a thickness of 0.05 millimeter to 5 millimeters, which can be rolled up. Consequently, in addition to "films" in the strict sense of thicknesses below 1 mm, the term also encompasses sealing sheets, of the kind typically used for sealing tunnels, roofs or swimming pools, in a thickness of typically 1 to 3 mm, and even, in special cases, in a thickness of up to a maximum of 5 mm. Polymeric films of this kind are produced typically by coating, casting, calendering or extruding, and are typically available commercially in rolls or are produced on site. They may be of single-layer or multilayer construction. The plastic of the polymer films is preferably a thermoplastic, e.g., polyesters, such as polyethylene terephthalate (PET), thermoplastic polyolefins (TPO) such as polyethylene, polypropylene, polyvinyl chloride, especially plasticized PVC, polyacetates, ethylene/vinyl acetate copolymers (EVA), ASA (acrylonitrile/styrene/acrylic ester), PUR (polyurethane), PA (polyamide), poly(meth)acrylates, polycarbonates, or their plastics alloys, including, in particular, foamed PVC films and foamed thermoplastic polyolefin films (TPO). Particular preference is given to PVC and thermoplastic polyolefins (TPO).

The moldings may also be moldings which are constructed from synthetic or natural fibers or chips bound together to form a molding by a binder; also suitable in particular are moldings made of plastic, e.g., ABS. The moldings may have any desired shape.

The substrates or moldings can be coated with the adhesive by customary application techniques, as for example by spraying, spreading, knife coating, die application, roll application or casting application methods. Spray application is preferred.

The amount of adhesive applied is preferably 0.5 to 100 g/m2, more preferably 2 to 80 g/m2, very preferably 10 to 70 g/m2, based on adhesive. Preferably either only one substrate to be bonded, as for example only the film or only the molding, is coated on one side. Also suitable, however, is the coating of both substrates to be bonded, or of film and molding. Following the coating operation, there is typically a drying operation, preferably at room temperature or temperatures up to 80° C., in order to remove water or other solvents.

The substrate or molding coated with one or two adhesive components may be stored prior to adhesive bonding. Flexible substrates can be wound up into rolls, for example. For adhesive bonding, the parts to be bonded are joined. The adhesive is thermally activated. The temperature in the layer of adhesive is preferably at least 30° C. or at least 50° C., e.g., from 30 to 200° C., or from 50 to 180° C. or from 60 to 80° C. Bonding is accomplished preferably under pressure. For this purpose, for example, the parts to be bonded may be pressed together with a pressure of at least 0.005 or at least 0.01 or at least 0.08 N/mm2, e.g., 0.005 to 5 N/mm2 or 0.01 to 0.8 N/mm2. The pressure applied may be generated, for example, by the generation of an underpressure between film and substrate, or by means of air pressure.

The composites obtained feature high mechanical strength even at elevated temperatures (heat stability) or under sharply fluctuating climatic conditions (climatic resistance).

The process of the invention is particularly important for the production of parts for installation in vehicles. The use of the adhesive of the invention for producing interior trim parts for automobiles is particularly preferred. Examples of interior trim parts of this kind are interior door trim, switch panels, dashboards, parcel shelves, roof panel linings, sliding-roof panel linings, center consoles, glove boxes, sun visors, pillars, door handles, arm rests, floor assemblies, loading-floor assemblies, and trunk assemblies, and also sleeping-cab walls and rear walls of vans and trucks. Used more particularly for this purpose is a vacuum forming process or a press lamination in the sealing process. In the case of the vacuum forming process, the adhesive is applied to the shaped body. This is followed optionally by flashing, for example, at room temperature or in a drying tunnel at preferably not more than 40° C. Typically the film to be adhered, such as a decorative film made of air-impermeable material, for example, is clamped airtightly into a frame. Beneath the film there is a bottom mold, onto which the shaped body is placed. Bottom mold and shaped body have drill holes or are air-permeable. The apparatus is closed off airtightly as well toward its bottom. When the air is withdrawn from this device under suction, the film then conforms accurately to the shaped body, under the atmospheric pressure bearing on the surface of the film. The film is heated prior to application of the vacuum or underpressure. On account of the vacuum or underpressure to be produced, the film is impermeable to air. In the case of the press lamination process, the adhesive is likewise applied to the shaped body and if desired to the film that is to be bonded, but at least to the shaped body. This is followed optionally by flashing, typically at room temperature or in a drying tunnel at preferably not more than 40° C. The adhesive bonding of shaped bodies to the film takes place following thermal activation, with joining and pressing. The films utilized here are in many cases decorative plastic films and have a surface structure. This surface structure on the plastics film may be introduced by embossing, for example, before, during or after adhesive bonding.

EXAMPLES

All percentages are given by weight unless indicated otherwise. The specifying of a content refers to the content in aqueous solution or dispersion. The viscosity can be determined in accordance with DIN EN ISO 3219 at a temperature of 23° C. using a rotational viscometer.

Ingredients:

Silane: 3-Glycidyloxypropyltrimethoxysilane, Available as Geniosil® GF 80 (Wacker-Chemie GmbH)

Crystalline Polyurethane:

Luphen® D 207 E; aqueous dispersion of a polyester-polyurethane elastomer with units derived from polyester diols, marketed by BASF SE as an adhesive base material for industrial lamination. Filming of the dispersion produces a polymer film which comprises crystalline domains.

Solids content 45% by weight; pH 6.5-8.5; viscosity 50-180 mPas (23° C., 250 s$^{-1}$).

Amorphous Polyurethane, PU-1:

Dispersion of a polyurethane, prepared from poly(tetrahydrofuran) with molecular weight Mn about 2000, dimethylolpropionic acid, isophorone diisocyanate and isophorone diamine, neutralized with triethylamine. Filming of the dispersion produces a polymer film which comprises no crystalline domains. Solids content 50% by weight, K value 40, viscosity 68 mPas, pH 6.8 (23° C.).

Amorphous Polyurethane, PU-2:

Dispersion of a polyurethane, prepared from poly(propylene oxide) with molecular weight Mn about 2000, dimethylolpropionic acid, neopentyl glycol, tolylene diisocyanate neutralized with NaOH. Filming of the dispersion produces a polymer film which comprises no crystalline domains.

Solids content 40% by weight, K value 47, viscosity 167 mPas, pH 7.6.

Ethylene/Vinyl Acetate Copolymer:

Airflex® EP 17; 60% by weight dispersion of an ethylene/vinyl acetate copolymer; viscosity 3800+/−1000 mPas (Brookfield RVT, spindle 3, 20 rpm);

pH 4-5 (23° C.)

Preparation of the Adhesives:

The dispersion components (see Table 1) are charged to a stirred vessel and then the silane is introduced with stirring. The adhesives labeled with C are noninventive comparative compositions.

TABLE 1

| Adhesive | First polymer [1] | Second polymer [1] | Silane |
|---|---|---|---|
| K1 | 52.1% Luphen ® D 207E | 46.9% PU-1 | 1.0% |
| K2 | 45.0% Airflex ® EP 17 | 54.0% PU-1 | 1.0% |
| K3 | 43.3% Airflex ® EP 17 | 51.7% PU-2 | 5.0% |
| C1 | — | 99.0% PU-1 | 1.0% |
| C2 | — | 95.0% PU-1 | 5.0% |
| C3 | 52.7% Luphen ® D 207E | 47.3% PU-1 | — |
| C4 | 45.5% Airflex ® EP 17 | 54.5% PU-1 | — |
| C5 | 52.7% Luphen ® D 207E | 47.3% PU-2 | — |
| C6 | 45.5% Airflex ® EP 17 | 54.5% PU-2 | — |

[1] Amounts in % by weight, based on solids content

Testing of Stability in Climatic Cycling Test 100-110 g/m² of the adhesive (wet) were applied to a molding (Rocholl GmbH, grain: Ford Flour Grain 89/030, 40 μm) consisting of ABS (Sabic, Cycolac G360 standard black), for producing interior automotive components, by means of a compressed-air atomizer (Krautzberger GmbH, HS-25 HVLP) and dried at room temperature for 90 minutes. The molding is V-shaped in cross section. The length of the outside edge is 200 mm, that of the width 145 mm. The angle at the middle of the outside edge is 105°. A film of plasticized PVC (Benecke Kaliko, Yorn", Material No. V3569838Z1750A, color: black, thickness: 1.2 mm, length: 160 mm) was laminated onto the ABS substrate. Heat-activated lamination was carried out using an upstroke thermoforming press (Burkle, model Lamp 0909/60) in a vacuum forming lamination procedure. After a preheating time of 80 s and application of reduced pressure over the course of 60 s, lamination was carried out at 4.5 bar for 45 seconds at a pressing temperature of 121° C.

The laminated molding was subjected, in a climatic testing cabinet (Weiss Umwelttechnik GmbH, SB/22/300/40), to the following test cycle:
1) 4 hours of storage at 90° C. (80% relative humidity)
2) 2 hours of cooling to −30° C.
3) 4 hours of storage at −30° C. (10% relative humidity)
4) 2 hours of heating to 90° C.

After passing through one complete test cycle, the composite is tested for delamination of the plasticized PVC film from the substrate. The test cycle is repeated until first signs of delamination are seen. For the purpose of evaluation, the maximum number of test cycles passed by a composite without delamination is recorded. The results are summarized in Table 2.

TABLE 2

| Adhesive | Number of cycles without delamination |
|---|---|
| K1 | 24 |
| K2 | 18 |
| K3 | 14 |
| C1 | 0 |
| C2 | 0 |
| C3 | 0 |
| C4 | 0 |
| C5 | 0 |
| C6 | 0 |

Table 2 clearly shows the advantages of the adhesives of the invention, with the composites exhibiting significantly better climatic cycling stability than the comparative compositions.

The invention claimed is:

1. An adhesive, comprising:
    (A) a first aqueous component comprising at least one first polymer and at least one different second polymer,
        (A1) wherein the first polymer is at least one polymer selected from the group consisting of a polyurethane capable of forming at least one crystalline domain, synthesized from a mixture comprising:
            a) at least one diisocyanate;
            b) at least one polyester diol having a molar weight above 500 g/mol but no more than 5000 g/mol;
            c) at least one diol comprising at least one carboxylic acid group; and,
            d) optionally, at least one further monofunctional or polyfunctional compound, different than compounds a)-c), comprising at least one reactive group selected from the group consisting of an alcoholic hydroxyl group, a primary amino group, a secondary amino group, and an isocyanate group, and
        a copolymer of ethylene and vinyl acetate,
        (A2) wherein the second polymer is an amorphous polyurethane comprising at least one unit derived from a polyether diol, and
        wherein at least one of the first and second polymers comprises at least one carboxyl group, and a quantitative weight ratio of the first polymer (A1) to the second polymer (A2) is from 2:8 to 8:2, and
    (B) a second component comprising at least one silane compound that is reactive toward a carboxyl group.

2. The adhesive of claim 1, wherein the first polymer (A1) has a heat of fusion of at least 20 J/g when present in the form of a polymer film.

3. The adhesive of claim 2,
    wherein the first polymer (A1) is at least one polymer selected from the group consisting of a polyurethane which forms at least one crystalline domain and comprises at least one unit derived from a polyester diol having a molar weight above 500 g/mol but no more than 5000 g/mol, and an ethylene/vinyl acetate copolymer, and
    wherein the second polymer (A2) is an amorphous polyurethane which comprises at least one unit derived from a polyether diol.

4. The adhesive of claim 2,
    wherein the first polymer (A1) is a polyurethane and comprises at least one unit comprising, in reacted form, a polyester diol having a molar weight above 500 g/mol but no more than 5000 g/mol, and the second polymer (A2) is a polyurethane and comprises at least one unit, in reacted form, derived from a polyether diol, wherein at least one of the two polyurethanes comprises at least one carboxyl group, and a quantitative weight ratio of a sum of all of the units derived from polyester diols to a sum of all of the units derived from polyether diols is from 2:9 to 7:2.

5. The adhesive of claim 2, wherein the first polymer (A1) and the second polymer (A2) constitute at least 40% by weight of the solids content of the adhesive when (A1) is a polyurethane polymer capable of forming at least one crystalline domain and 10 to 75 parts by weight of the solids content of the adhesive when (A1) is a copolymer of ethylene and vinyl acetate.

6. The adhesive of claim 1, wherein the first component comprises:
   (a) 20-80 parts by weight of at least one first polymer (A1) selected from the group consisting of i) a crystalline-domain-forming polyurethane with at least one unit comprising, in reacted form, a polyester diol having a molar weight above 500 g/mol but no more than 5000 g/mol and without a unit derived from a polyether diol, and (ii) an ethylene/vinyl acetate copolymer;
   (b) 20-80 parts by weight of at least one amorphous polyurethane with at least one unit comprising, in reacted form, a polyether diol and without a unit derived from a polyester diol; and,
   (c) 0-50 parts by weight of at least one further polymer different from (a) and (b).

7. The adhesive of claim 6, wherein the aqueous component of the adhesive further comprises 10 to 50 parts by weight of a polymer different from (a) and (b) selected from the group consisting of polyvinyl acetates, poly(meth)acrylates, polyacrylates, carboxylated styrene/butadiene copolymers, and mixtures thereof.

8. The adhesive of claim 6, wherein the first polymer (A1) and the second polymer (A2) constitute 40% to 80% by weight of the solids content of the adhesive when (A1) is a polyurethane polymer capable of forming at least one crystalline domain.

9. The adhesive of claim 1, wherein the first polymer (A1) is a polyurethane synthesized from a mixture comprising:
   a) at least one diisocyanate;
   b) at least one polyester diol having a molar weight above 500 g/mol to but no more than 5000 g/mol;
   c) at least one diol comprising at least one carboxylic acid group; and,
   d) optionally, at least one further monofunctional or polyfunctional compound, different than compounds a)-c), comprising at least one reactive group selected from the group consisting of an alcoholic hydroxyl group, a primary amino group, a secondary amino group, and an isocyanate group,
   wherein the second polymer (A2) is synthesized from a mixture comprising:
   a) at least one diisocyanate;
   b) at least one polyether diol having a molar weight of 240 to 5000 g/mol;
   c) at least one diol containing comprising at least one carboxylic acid group; and,
   d) optionally, at least one further monofunctional or polyfunctional compound, different than compounds a)-c), comprising at least one reactive group selected from the group consisting of an alcoholic hydroxyl group, a primary amino group, a secondary amino group, and an isocyanate group.

10. The adhesive of claim 1, wherein the second polymer (A2) is a polyurethane and comprises at least one unit comprising, in reacted form, at least one polyether diol selected from the group consisting of a polytetrahydrofuran and a polypropylene oxide, and
   wherein the first polymer (A1) is a polyurethane and comprises at least one unit comprising, in reacted form, a polyester diol having a molar weight above 500 g/mol but no more than 5000 g/mol selected from the group consisting of a reaction product of at least one dihydric alcohol with at least one dibasic carboxylic acid and a lactone-based polyester diol.

11. The adhesive of claim 1, wherein the at least one silane compound has a formula:

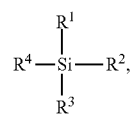

wherein $R^1$ to $R^4$ each independently are an organic radical or a hydroxyl group, with the proviso that at least two of the groups $R^1$ to $R^4$ are selected from the group consisting of a hydroxyl group and an alkoxy group,
   wherein at least one of the remaining groups $R^1$ to $R^4$ is an organic radical comprising at least one functional group selected from the group consisting of a primary amino group, a secondary amino group, an acid group, an acid anhydride group, a carbamate group, an isocyanate group, a hydroxyl group, and an epoxy group.

12. The adhesive of claim 8, wherein two or three of the groups $R^1$ to $R^4$ are an alkoxy group.

13. The adhesive of claim 1, wherein the at least one silane compound is a glycidyloxyalkyltrialkoxysilane comprising in each case 1 to 5 C atoms in the alkyl groups and in the alkoxy groups.

14. The adhesive of claim 1, wherein the at least one silane is present in a range from more than 0.2 to 30 parts by weight per 100 parts by weight of polymers.

15. The adhesive of claim 1, further comprising at least one additive selected from the group consisting of a binder, a stabilizer, a filler, a thickener, a wetting assistant, a defoamer, a crosslinker, an aging inhibitor, a fungicide, a pigment, a soluble dye, a matting agent, and a neutralizing agent.

16. The adhesive of claim 1, wherein a polyurethane is comprised in the first polymer, and is in dispersion in water in the form of an aqueous polyurethane dispersion.

17. The adhesive of claim 1, wherein the first polymer (A1) is a polyurethane which is crystalline in a pure state and has a melting point in a range from 30 to 150° C.

18. The adhesive of claim 1,
   wherein the first polymer (A1) is a polyurethane and comprises at least one unit comprising, in reacted form, a polyester diol having a molar weight above 500 g/mol but no more than 5000 g/mol, and the second polymer (A2) is a polyurethane and comprises at least one unit, in reacted form, derived from a polyether diol,
   wherein at least one of the two polyurethanes comprises at least one carboxyl group, and a quantitative weight ratio of a sum of all of the units derived from polyester diols to a sum of all of the units derived from polyether diols is from 2:9 to 7:2.

19. An adhesive, comprising:
   (A) a first aqueous component comprising at least one first polymer and at least one different second polymer, (A1) wherein the first polymer is a polyurethane capable of forming at least one crystalline domain, synthesized from a mixture comprising:
  a) at least one diisocyanate;
  b) at least one polyester diol having a molar weight above 500 g/mol but no more than 5000 g/mol;
  c) at least one diol comprising at least one carboxylic acid group; and,
  d) optionally, at least one further monofunctional or polyfunctional compound, different than compounds a)-c), comprising at least one reactive group selected from the group consisting of an alcoholic hydroxyl group, a primary amino group, a secondary amino group, and an isocyanate group,
(A2) wherein the second polymer is an amorphous polyurethane and comprises at least one unit, in reacted form, derived from a polyether diol,
wherein at least one of the first and second polymers comprises at least one carboxyl group,
wherein a quantitative weight ratio of the first polymer (A1) to the second polymer (A2) is from 2:8 to 8:2, and
wherein a quantitative weight ratio of a sum of all of the units derived from polyester diols to a sum of all of the units derived from polyether diols is from 2:9 to 7:2; and
  (B) a second component comprising at least one silane compound that is reactive toward a carboxyl group.

20. A film-laminated molding, comprising, in adhered form, the adhesive of claim 1, wherein the molding is suitable for automobile construction with resistance to climatic cycling.

21. A method of producing a film-laminated molding, the method comprising:
  a) mixing the first aqueous component (A) and the second component (B) of the adhesive of claim 1, to obtain a mixture;
  b) applying the mixture to at least one member selected from the group consisting of a polymer film and a molding; and
  c) bonding the polymer film to the molding under at least one condition selected from the group consisting of an increased pressure and an increased temperature.

22. A composite, comprising a solid shaped body to which a flexible film is adhered with the adhesive of claim 1.

* * * * *